United States Patent [19]

Proctor et al.

[11] Patent Number: 5,042,038
[45] Date of Patent: Aug. 20, 1991

[54] DATA PATH CHECKING SYSTEM

[75] Inventors: Richard J. Proctor; Thomas S. Maddern, both of Dorset, England

[73] Assignee: Plessey Overseas Limited, Ilford, England

[21] Appl. No.: 338,744

[22] Filed: Apr. 17, 1989

[30] Foreign Application Priority Data

Mar. 30, 1988 [GB] United Kingdom ................. 8807606

[51] Int. Cl.⁵ ............................................. G06F 15/40
[52] U.S. Cl. .................................... 371/68.1; 371/8.1; 371/8.2; 371/27
[58] Field of Search ..................... 371/68.1, 68.2, 68.3, 371/25.1, 20.4, 8.1, 8.2, 23, 27

[56] References Cited

U.S. PATENT DOCUMENTS

| | | | |
|---|---|---|---|
| 3,492,446 | 1/1970 | Lapsevskis et al. | 371/68.2 |
| 3,740,645 | 6/1973 | Cook | 371/25.1 |
| 4,112,414 | 9/1978 | Iscol et al. | 371/68.2 |
| 4,442,502 | 4/1984 | Friend et al. | 371/8.1 |
| 4,607,365 | 8/1986 | Greig et al. | 371/8.1 |
| 4,710,935 | 12/1987 | Kim et al. | 371/68.2 |
| 4,759,019 | 7/1988 | Bentley et al. | 371/23 |
| 4,805,085 | 2/1989 | Mogi et al. | 371/8.2 |
| 4,817,094 | 3/1989 | Lebizay et al. | 371/68.2 |
| 4,864,568 | 9/1989 | Sato et al. | 371/8.2 |
| 4,903,267 | 2/1990 | Arai et al. | 371/27 |

FOREIGN PATENT DOCUMENTS 2141606 12/1984 United Kingdom .

Primary Examiner—Jerry Smith
Assistant Examiner—Phcong My Chung
Attorney, Agent, or Firm—Fleit, Jacobson, Cohn, Price, Holman & Stern

[57] ABSTRACT

A data pathchecking system for resolving data transfer errors in a plane of directly connected switching elements, the system checking the plane of directly connected switching elements by designating one switching element with an associated control element as a master and other switching elements and associated control elements as slaves. The master switch element instructs other switch elements discretely to check their respective switching element for data transfer errors and checks its own switching element for data transfer errors. Furthermore, the master switch is arranged to validate connections between switching elements.

7 Claims, 3 Drawing Sheets

DATA PATH CHECKING SYSTEM

FIELD OF THE INVENTION

The present invention relates to a data path checking system and more particularly, but not exclusively, to data path checking in a network of digital switching modules (DSM).

DESCRIPTION OF THE PRIOR ART

A digital switching module (DSM) is a switching element used quite extensively in construction of telecommunication exchange switches. Each DSM is interconnected in a network plane such that a multitude of connection or switching paths are available across the exchange switch in order to connect on input port to an output port. As will be appreciated there is a requirement to ensure accuracy and integrity of data as it is switched between the input ports and the output ports through DSM's in a designated switching path.

A simple approach to checking the accuracy and integrity of switched data is to provide duplication or triplication of DSM network planes. Each DSM plane is equivalent and parallel with common input ports. An error in switched data is established by sending a common data message through parallel DSM planes then comparing the received data messages at the respective output ports. A discrepancy between the received data messages indicates an error. One plane will be designated as correct however and the user biased to that plane.

Having established an error in the data switching arrangement or exchange switch it is convenient, and economically necessary, to determine more accurately the location of the error precipitating DSM or DSM interconnection. This more accurate location of the data error is the function of the data path checking system.

A typical data path checking system can be described with reference to FIGS. 1–4. A data path is checked by injection of a test data message or timed series of test messages. Progression of the test message is checked through the DSM elements of the exchange switch data path.

FIG. 1 is symbolic illustration of a simple duplex path for a switch arrangement. The duplex path is from line termination A to line termination B passing through DSM's A, B and C in one direction and DSM's F, E and D in other. Line terminations $A_{RX}$, $A_{TX}$, $B_{TX}$ and $B_{RX}$ where $TX$=transmission and $RX$=reception provide a loop back between DSM's A, B, C, and F, E, D. Test data messages are normally injected directly into the duplex path through one of the DSM's A, B, C, F, E, D. With the DSM's A, B, C, F, E, D effectively looped, the test message input at any DSM can be checked at each DSM subsequently in the loop ie. if the test message is injected at DSM B it can be checked for at DSM's B, C, F, E, D, and A in succession. All the DSM A, B, C, F, E, D, loops are thus checked but for the output port of DSM A, the connection between DSM A to DSM B and DSM B except its output port. A further data pathcheck with the test message injected at DSM E would check those un-checked elements above. By this simple test the error producing element will be located to within almost one DSM and an input connection from the previous DSM.

FIGS. 2–4 illustrate the above test and further tests to improve location resolution of the error DSM. FIG. 2 illustrates the test described above. The test identifies a suspect area of the loop comprising DSM B and its input connection from DSM A. In FIG. 3 a second test is illustrated wherein the suspect DSM B and its output are checked, by injecting the test message at DSM B and checking that message at a subsequent DSM C. If the second test fails then DSM B is almost certainly faulty. If the second test is passed then a third test as illustrated in FIG. 4 must be conducted. In the third test a number of different input connections to DSM B are checked. If more than one input connection fails then DSM B is faulty, if only one input connection fails then it is the connection between DSM A to DSM B or both DSM's A, B that have failed. The area of fault has however been substantially resolved and consequently a maintenance engineer can be dispatched to that DSM area of the exchange switch.

Practically, a series of test messages are injected in timed sequence in order to establish the existence of timing faults and stuck data bits.

This known DSM data path checking system is severely limited when planes of DSM switches are directly connected together. With planes of DSM directly connected there are no line terminations between the planes to effect looping back between data paths consequently the test message cannot be checked as it passes about such a loop. Line terminations are however provided at the periphery of such DSM planes. It will be appreciated that the problem stems from each DSM plane being independent and thus adjacent DSM planes do not have access to or receive information about test message states from each other. The provision of intercommunication connections to allow transfer of such information would be expensive.

BRIEF SUMMARY OF THE INVENTION

It is an objective of the present invention to provide a data pathcheck system in which an exchange switch constructed of several directly connected DSM or switching planes can be checked to locate the cause of a data transfer error.

According to the present invention, there is provided a data path check system for locating a fault in a plurality of serially coupled switching elements in a single plane when an error in data transfer across those switching elements is determined by other means, the system comprising said switching elements directly coupled together by interconnections and respectively controlled by control elements, said control elements being coupled for determining which interconnections are in operation such that a data path comprising several switching elements and interconnections is defined, whereby in operation, when an error in data transfer is determined that error can be associated with the data path defined and each switching element and each interconnection of that data path may be independently checked by comparison of an injection test message with a received test message across the switching element or respective interconnection thereby locating the fault in data transfer.

The invention also provides a method of checking a data transfer path across a plurality of serially coupled switching elements comprising:
(i) designating at least one of said serially coupled switching elements as a master switching element whereby that master switching element stores the state of adjacent switching elements interconnections with said master switching element;

(ii) causing said master switching element to arrange for each switching element, including itself, to be discretely checked by injection of a test data message into switching modules in said respective switching elements, (iii) causing said master switching element to arrange for interconnections between switching elements to be checked; and, (iv) causing said master switching element to compile the results of said discrete checking of each switching element and said checking of said interconnections between said switching elements whereby the data transfer path across the plurality of directly coupled switching elements is completely checked.

BRIEF DESCRIPTION OF THE DRAWINGS

An embodiment of the present invention will now be described by way of example only with reference to the accompanying drawings in which.

DESCRIPTION OF THE PRESENT INVENTION

Figure 1:
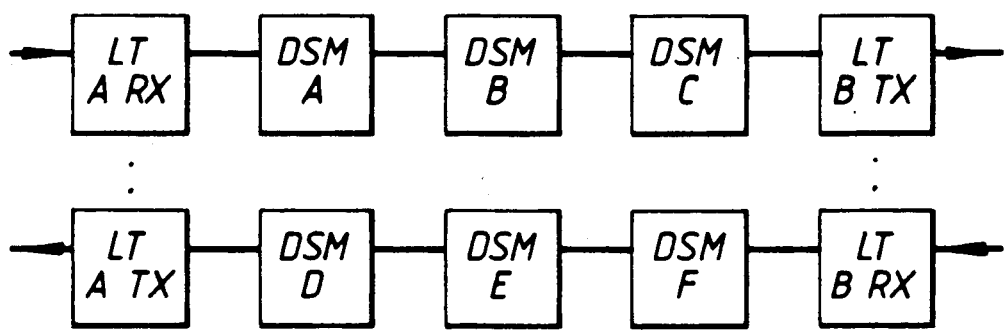
FIG. 1 is a symbolic illustration of a simple duplex path for a switch arrangement.
Figure 2:
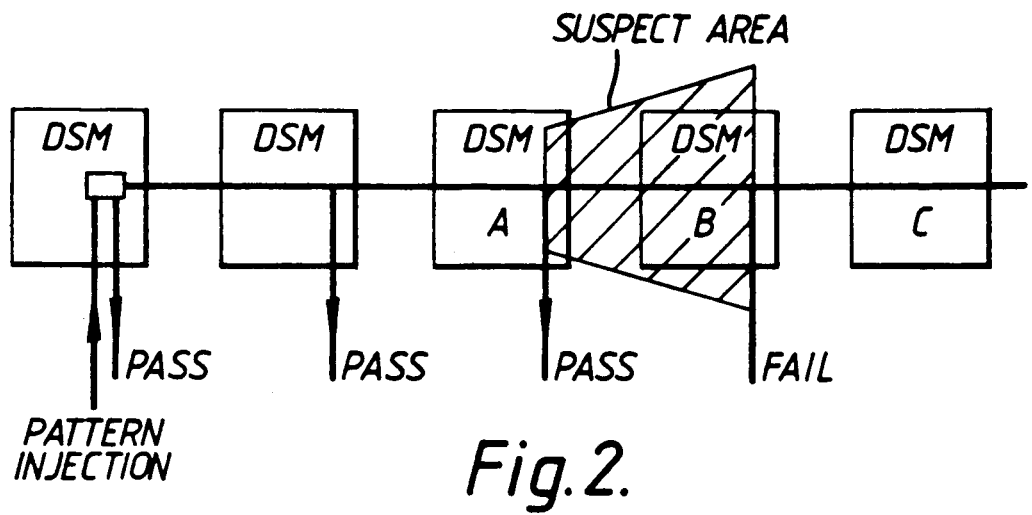
FIG. 2 illustrates, symbolically, a first test stage for location of an error in a digital switch module (D.S.M)
Figure 3:
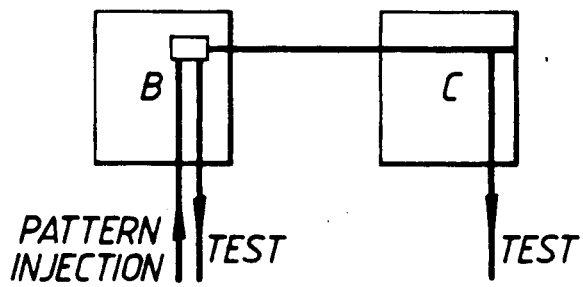
FIG. 3 illustrates, symbolically, a second test stage for location of a error in a digital switch module (D.S.M)
Figure 4:
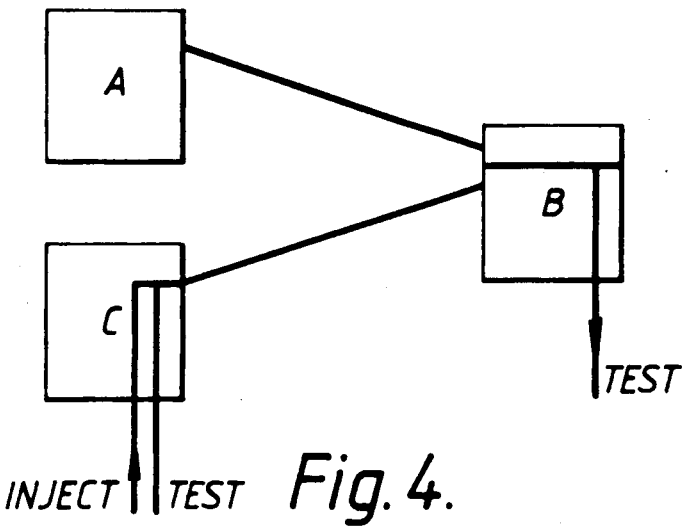
FIG. 4 illustrates, symbolically, a third test stage for location of a error in a digital switch module (D.S.M)
Figure 5:
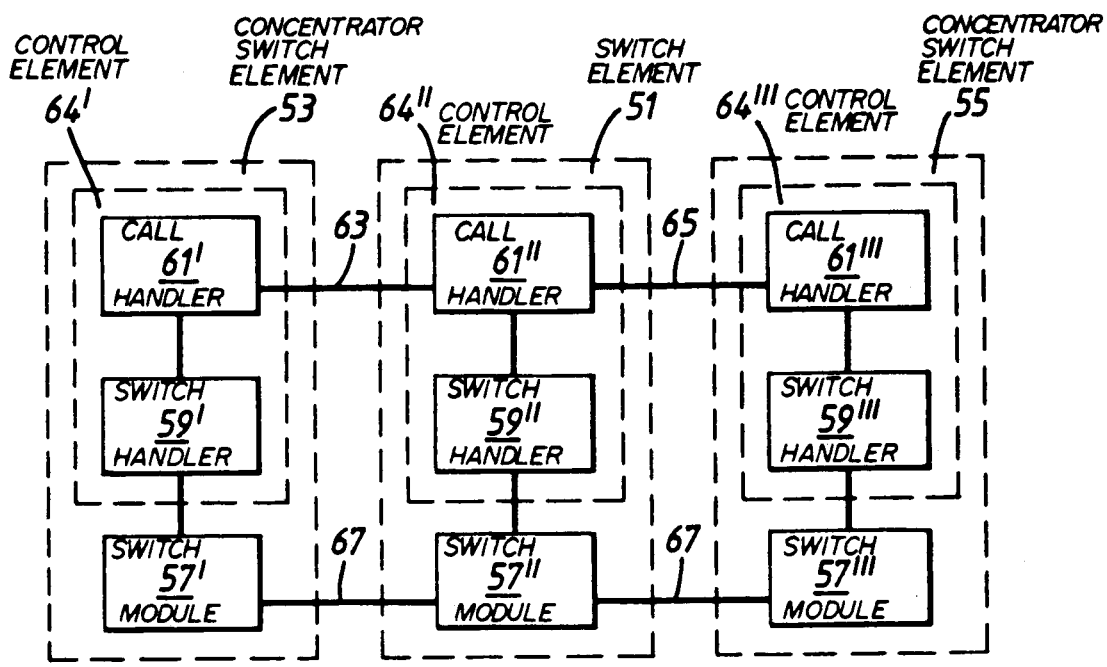
FIG. 5 illustrates, in block diagram form, a typical switch control arrangement for an exchange comprising several directly connected switch elements or planes; and, FIG. 6 illustrates, in block diagram form, an embodiment of the present invention comprising two switch planes and two line termination elements.

Considering FIG. 5, a block diagram illustrates an exchange comprising a main exchange switch element 51 and concentrator switch elements (53, 55). The conentrator switch elements (53, 55) provides concentration of the number of user lines to a smaller number of exchange lines; this ensures economic use of the available exchange equipment.

The exchange switch element 51 provides actual switching between user's. Typically, the exchange switch element 51 and concentrator elements (53, 55) are similar devices directly connected. Consequently, the exchange switch element 51 and the concentrator switch elements (53, 55) have the same configuration of a switch module 57', 57" and 57'", a switch handler 59', 59", 59'" and a call handler 61', 61", 61'". Each of the switch handlers 59', 59", 59'" and call handlers 61', 61", 61'" are conveniently combined, the combination being referred to as a control element 64', 64", 64'". Each of the switch modules 57', 57", 57'" may comprise parallel planes of DSM elements and is directly coupled to other switch modules 57 in the exchange. The call handlers 61', 61", 61'" in the exchange are connected by connections 63, 65 such that a call can be monitored through the concentrators (53, 55) and the exchange switch element 51.

These connections 63, 65 are broadband and relatively high speed, as are connections between the switch modules 57', 57", 57'" and the switch handlers 59', 59", 59'", and the switch handlers 59 and the call handlers 61', 61", 61'". The call handlers 61', 61", 61'" stimulate the switch handlers 59', 59", 59'" to set the switch moduli 57', 57", 57'" to provide a data path 67 connecting users across the exchange. The data path 67 carries data signals along with clock and control signals. This enables direct communication between switch elements 64', 64", 64'" without using the connections 63, 65.

An error in data transfered across the exchange can be detected in the usual way previously described by having duplicate switching planes coupled such that data messages are sent via both planes and compared. When an error is thus detected, the switch control element 64" of the main exchange switch element 51 is made a master to find error location while control elements 64', 64'" are slaves. The control element 64" intructs its own switch element 57" and other control elements 64', 64'" to perform path checks as previously described. The instruction signals to 57', 57" and 57'" need not be by the data path 67 but such will improve the speed of error resolution. Each section of the data path 67 defined by a switching element 57 is thus discretely checked with the master control 64" compiling the results of such discrete checking to identify the area of the exchange which is at error.

Discrete checking of switching elements 57', 57" and 57'" does not provide validity for the data path, a method of providing such will now be described with reference to FIG. 6.

Figure 6:
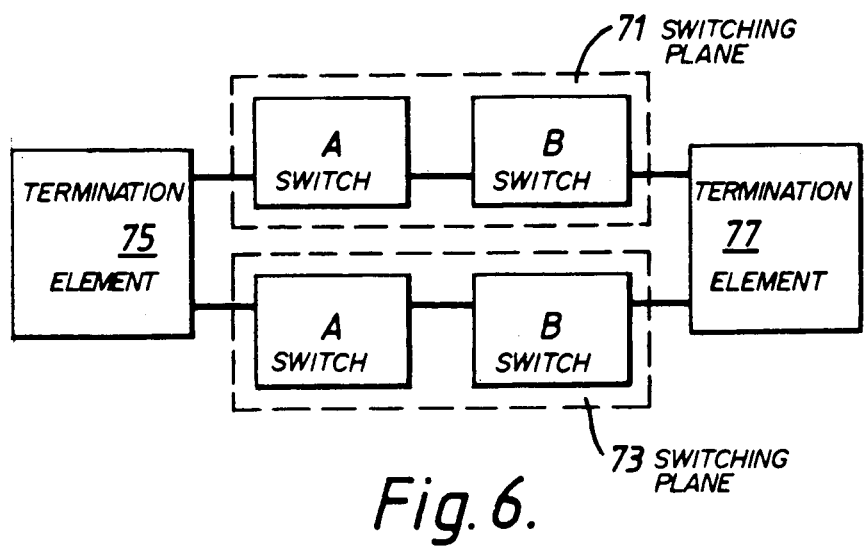

FIG. 6 illustrates, in symbolic form, an arrangement including two directly connected switching planes 71, 73 with line termination elements 75, 77 at each end. The line termination elements 75, 77 allow "looping back" of data signals between switching planes 71, 73. Each plane 71, 73 comprise a switch A directly connected to a switch B. To check the validity of a data path ie. the validity of connections between switching elements, the state of all switching elements is required.

According to the described embodiment of the present invention for checking the validity of a data path, one switch is designated as the main or master switch. For reasons of description we will assume switch B is made the master switch. The master switch is arranged whereby it holds, probably in its control element 64, the transistory state of each switch connected to it ie. A. Thus, switch A sends a state signal to switch B indicative of the state of connections between switch A and switch B whenever that state changes, such as when it sets up or clears a path that is only valid in one plane. The master switch B compares this state signal with the state of its connections to ensure compliance and thus path validity. It should be noted that state signals are only sent when an error is detected.

With three switches the principles applied to the situation of two switches, as in FIG. 6, are still valid. The central switch is determined as the master switch with state signals being sent from adjacent switches.

It will be appreciated that a data path can be completely checked by the system of the present invention with each switching element checked by the method described in relation to FIG. 5 and connections between switches validated or checked by the method described in relation FIG. 6.

What we claim is:

1. A data path check system for locating an error fault in a plurality of serially coupled switching elements in a single plane, the system comprising:

interconnection means, said interconnection means comprising a plurality of interconnections arranged to serially couple said plurality of switching elements;

control elements, said control elements being arranged to control said plurality of switching elements and determine operative interconnections of said plurality of interconnections, said operative interconnections defining a data path comprising several of said switching elements and respective interconnections of said plurality of interconnections, said control elements being further arranged when an error is determined in said data path to provide a test message, said test message being independently injected and received across each said interconnection and each said switching element of said data path to determine by comparison the position of said error in said data path.

2. A system as claimed in claim 1 wherein the test message is a plurality of data words in timed sequence.

3. A system as claimed in claim 1 wherein the switching elements are arranged into a plurality of parallel switching planes with common input and output ports and a respective data path defined in each switching plane between said common input and output ports.

4. A system as claimed in claim 3 wherein there are two parallel switching planes arranged so that, on operation, the same data is transferred across each switching plane and compared at the common output to determine an error in data transfer.

5. A telecommunication network including a data path check system as claimed in claim 1.

6. A method of checking a data transfer path across a plurality of serially coupled switching elements in a single plane comprising:

(i) designating at least one of said serially coupled switching elements as a master switching element whereby that master switching element stores the state of adjacent switching elements interconnections with said master switching element;

(ii) causing said master switching element to arrange for each switching element, including itself, to be discretely checked by injection of a test data message into switching modules in said respective switching elements, (iii) causing said master switching element to arrange for interconnections between switching elements to be checked; and (iv) causing said master switching element to compile the results of said discrete checking of each switching element and said checking of said interconnections between said switching elements whereby the data transfer path across the plurality of serially coupled switching elements is completely checked.

7. A data path check system for locating the cause of a data transfer error, comprising:

exchange switch means; and a plurality of concentrator means directly connected to said exchange switch means;

said exchange switch means and said plurality of concentrator means each comprise: control means including a switch handler and a call handler; and a switch module connected to a respective control element wherein each switch module is serially coupled to other switch modules and said call handlers stimulate respective switch handlers to set respective switch modulators for providing a data path across the system allowing direct communication between switch elements so upon detection of an error said control means of said exchange switch means signals said control means of each of said plurality of concentrator means to perform path checks, results of which checks are compiled in said control means of said exchange switch means for identifying an area which is at error.

* * * * *